Patented Dec. 14, 1937

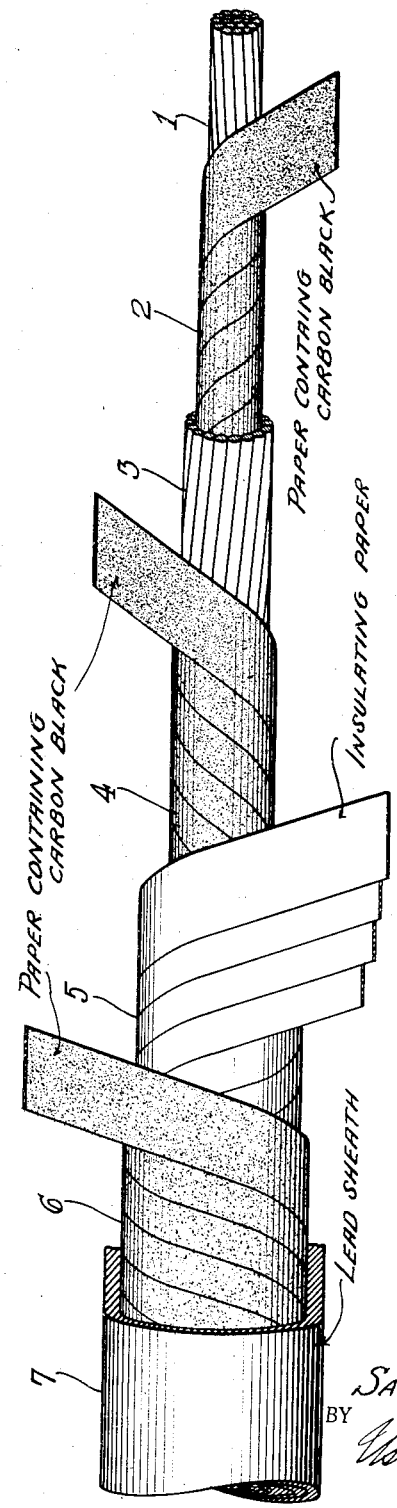

2,102,129

UNITED STATES PATENT OFFICE 2,102,129

ELECTRIC CABLE

Samuel J. Rosch, Yonkers, N. Y., assignor to Anaconda Wire & Cable Company, New York, N. Y., a corporation of Delaware Application November 15, 1934, Serial No. 753,107

10 Claims. (Cl. 173—266)

This application is a continuation in part of my co-pending application Serial No. 613,412, filed May 25, 1932.

My invention relates to improvements in electric cables, particularly cables in which the conductor is wrapped with tape of paper or other suitable material which is impregnated with an insulating fluid such as oil.

Cables of the above type are generally made by wrapping a conductor, formed either of a single wire or of a number of wire strands, with several wrappings from about 10 to 160, or even more, of paper which is then carefully dried and evacuated or freed from air and gases and then impregnated with a suitable insulating fluid such as oil. The insulated and impregnated conductor is then enclosed in a sheath of lead or other suitable material. The electrical strength of the completed cable depends upon the particular characteristics of the paper and of the impregnating material and of the manner in which they are combined.

The wrapped insulating structure is generally made of paper of greater or less density and when tightly wrapped presents a very compact and extremely dense insulating structure through which the impregnating compound or fluid must penetrate and thoroughly impregnate. In cables of the highest quality the oil or insulating liquid with which the paper wrappings are to be impregnated may even be very carefully purified to remove any impurities that would decrease or impair its electrical properties. The initially high electric strength of the cable, however, decreases upon use owing to a deterioration of the insulating oil. This deterioration is due to certain reactions or decompositions of the oil in the cable which are heightened or hastened by catalytic action of the conductor and sheath in the layers of paper nearest the conducting core and the sheath. This deterioration is indicated by a change in the power factor of the insulation layers in the immediate region of conductor and sheath. For example, a new cable will have a substantially uniform power factor throughout its insulating structure except for a few layers near the conductor and near the sheath which have a slightly greater power factor. However, after the cable has been in use, the deterioration as measured by this change in power factor increases very greatly near the conductor and sheath, particularly near the conductor which during operation is at the higher temperature, and spreads thence progressively into the interior of the mass of paper.

An object of my invention is to provide a cable structure in which this deterioration of the cable, because of deterioration or impairment of the qualities of the insulating fluid, is prevented or minimized.

In my invention I provide in a suitable part of the cross section of the cable a quantity of carbon black which is always in contact with the insulating oil and serves as a purifying agent to remove the products of decomposition as they are formed or to prevent their formation. The carbon black may be placed at any suitable cross section of the cable, preferably, in the layers of the wrapping immediately adjacent the metal of the cable, that is, the conductor and the sheath. The carbon black is thus in free contact with the insulating fluid, particularly the fluid as it comes nearest to contact with the metals. Displacement of the carbon black with the movement of the oil is prevented because of the density of the paper wrapping which effectively holds the carbon black particles from movement. The carbon black may be placed and held in position in any suitable manner. Preferably, it is incorporated in the paper that forms the wrapping layers nearest the conductor and sheath. For this purpose it may be beaten into the pulp from which the paper is formed and the minute particles of the black are thus permanently incorporated in the paper that is to be used for the particular strands.

A part of the paper thus loaded with carbon black may be incorporated in the conductor itself if the latter be formed of several strand layers and for this purpose may be wrapped about an inner layer and then covered with an outer layer of strands, or the paper may be wrapped about the conducting core, or both constructions may be employed.

The insulating wrappings which are not loaded with carbon black are then wound onto the conductor. After the insulating layer has been formed, a few additional layers of paper loaded with carbon black may be wound on the insulating structure just before the sheath is applied in order to provide a quantity of carbon black in the region immediately adjacent the sheath. With this construction, any deterioration that takes place near the conductor core or sheath is immediately counteracted by the carbon black adjacent the metallic core and sheath, and thus prevented from building up or from spreading into the body of the insulation.

Any good clean grade of carbon black or carbon gas black, that is, carbon made by the imperfect combustion of natural gas or similar hydrocarbon gases may be employed. This carbon black is to be distinguished from carbonaceous blacks or charcoals formed from other material or in other ways, that is, it is to be distinguished from lamp black which is made by imperfect combustion of oils or oily liquids, or from carbons made by the destructive distillation of vegetable or animal material. Such carbons as lamp black or graphite detract rather than add to the electrical qualities of the impregnating oil and are not to be substituted for carbon black.

A carbon black of the grade known as "Micronex" has been found to be very satisfactory and is used to form about 10% of the weight of the paper in which it is incorporated.

In the accompanying drawing, a cable constructed in accordance with my invention is illustrated by way of example, parts of the cable being shown removed or in section to illustrate the several layers of insulation or cable forming material.

In the cable shown in the accompanying drawing, the inner core of conductor strands 1 is wrapped with a layer of paper 2 loaded with carbon black, and then with an outer layer 3 of conducting strands. The conductor thus formed is then wrapped with a few layers 4 of paper loaded with carbon black and then with several layers 5 of insulating paper material. It will be understood that the layers 5 do not contain any carbon black. A few wrappings 6 of carbon black loaded paper is then wrapped on the insulation 5 and the lead sheath 7 is applied after the structure has been thoroughly impregnated with insulating oil.

In impregnating the insulation in the above cable a temperature in the oil of from 80° C. to 115° C. is preferably employed.

The above construction illustrates one in which but a single conductor is incorporated in a lead sheath. Cables having a plurality of conductors as, for example, three are commonly employed. My invention will be used in these multi-conductor cables, it being necessary only to provide in a localized part of the cross section of the cable a quantity of carbon black freely accessible to the insulating fluid within the cable. In the tightly packed insulation the carbon black will remain in place and yet be effective for removing products of deterioration that may be formed in the insulating fluid. In all cases, however, it is preferable to have the carbon black near the conductor and near the outer sheath so that it will come into immediate contact with the insulating fluid near the region where the deterioration is greatest.

As the construction of multiple conductor cables is well known and the positioning of the carbon black in any desired position in such multiple conductor cables is obvious, they are not specifically illustrated in the accompanying drawing.

Through my invention the insulating fluid in an insulating structure, subjected to contact with metals and to temperatures above normal atmospheric temperatures, may be preserved from the effects of deterioration. Consequently the useful life of the cable is prolonged and its efficiency or effectiveness during its life is increased

What I claim is—

1. An electric conducting cable comprising a conductor, wrappings of insulating tape about said conductor, impregnating fluid in said wrappings, a sheath enclosing said wrappings and conductor, and carbon black in position adjacent said conductor and in contact with said impregnating fluid.

2. An electric conducting cable comprising a conductor, wrappings of insulating tape about said conductor, impregnating fluid in said wrappings, a sheath enclosing said wrappings and conductor, and a layer of material containing carbon black in position adjacent said sheath and in contact with said impregnating fluid.

3. An electric conducting cable comprising a conductor, a permeable insulation surrounding said conductor, impregnating fluid impregnating said permeable insulation, a sheath enclosing said insulation, and a mass of carbon black positioned in said permeable insulation adjacent said conductor in contact with said impregnating fluid.

4. An electric conducting cable comprising a conductor, a permeable insulation about said conductor, impregnating fluid permeating said insulation, and a mass of carbon black in the cross section of said cable positioned adjacent said conductor and in free contact with said impregnating fluid.

5. An electric conducting cable comprising a conductor, wrappings of paper about said conductor, certain of said wrappings having carbon black embedded therein, and an impregnating insulating fluid permeating said wrappings.

6. An electric conducting cable comprising a conductor, wrappings of tape impregnated with carbon black about said conductor, wrappings of insulating tape about said carbon black impregnated wrappings, impregnating fluid permeating said wrappings, and a sheath enclosing said wrappings.

7. An electric conducting cable comprising a conductor, wrappings of tape embedded with carbon black about said conductor, wrappings of insulating tape about said carbon black and tape wrappings, an outer wrapping of tape impregnated with carbon black, impregnating fluid permeating all of said wrappings, and a sheath enclosing said wrappings.

8. A method of constructing an electric conducting cable which comprises wrapping insulating tape about a conductor to form a number of layers of tape, forming layers of tape impregnated with carbon black in said insulating structure, and impregnating said insulating structure with an insulating fluid at a temperature of from about 80° C. to 115° C.

9. An electric conducting cable comprising a conductor of layers of conducting strands, a layer of paper containing carbon black between a pair of strands of said conductor, an insulating layer surrounding said conductor and formed of oil impregnated tape and a sheath enclosing said oil impregnated tape, said strands also being filled with impregnated fluid in contact with said carbon black.

10. An electric conducting cable comprising a conductor made of successive layers of conducting strands, a layer of tape impregnated with carbon black wrapped spirally between a pair of said layers of strands, a wrapping of tape impregnated with carbon black about said conductor, wrappings of insulating tape about said enclosing layer of carbon black impregnated tape, a sheath enclosing said insulated structure and an impregnating fluid in said insulating layers and said conductor in contact with the carbon black therein.

SAMUEL J. ROSCH.